(12) United States Patent
Fujioka et al.

(10) Patent No.: US 8,985,786 B2
(45) Date of Patent: Mar. 24, 2015

(54) IMAGE PROJECTION APPARATUS

(75) Inventors: Tetsuya Fujioka, Kanagawa (JP);
Masamichi Yamada, Kanagawa (JP);
Yasutada Tsukioka, Kanagawa (JP);
Naoyuki Ishikawa, Kanagawa (JP);
Hideo Kanai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 125 days.

(21) Appl. No.: 13/611,508

(22) Filed: Sep. 12, 2012

(65) Prior Publication Data

US 2013/0070216 A1   Mar. 21, 2013

(30) Foreign Application Priority Data

Sep. 16, 2011   (JP) ................................. 2011-203430

(51) Int. Cl.
  *G03B 21/28*    (2006.01)
  *G03B 21/20*    (2006.01)
  *H04N 9/31*     (2006.01)

(52) U.S. Cl.
  CPC ............ *G03B 21/28* (2013.01); *G03B 21/2066* (2013.01); *H04N 9/3141* (2013.01)
  USPC ................... 353/99; 353/30; 353/38; 353/98; 353/119; 359/850; 359/863

(58) Field of Classification Search
  USPC ........... 353/30, 31, 34, 38, 79, 81, 82, 74, 77, 353/78, 98, 99, 119; 359/850, 863, 864, 359/869, 893, 904; 348/744, 750, 756, 745, 348/781; 349/5, 7–9
  See application file for complete search history.

(56) References Cited

U.S. PATENT DOCUMENTS 3,644,030 A *   2/1972   Fukushima ..................... 353/98
5,592,239 A     1/1997   Hara et al.
5,605,390 A     2/1997   Brice et al.
(Continued)

FOREIGN PATENT DOCUMENTS

CN   201222159 Y   4/2009
JP   5-328376      12/1993
(Continued)

OTHER PUBLICATIONS

Communication pursuant to Article 94(3) EPC issued Nov. 6, 2013 in Patent Application No. 12 184 113.4.
(Continued)

*Primary Examiner* — Sultan Chowdhury
(74) *Attorney, Agent, or Firm* — Oblon, McClelland, Maier & Neustadt, L.L.P.

(57) ABSTRACT

Provided is an image projection apparatus, such as a projector, including a light source; an image generating element such as a DMD that receives light from the light source and forms an image; an image generating unit that irradiates the image generating element with the light from the light source; a first optical system including multiple transmission refractive optical elements; a second optical system arranged on an optical path of outgoing light of the first optical system and including a reflection optical element; and a projection optical system that enlarges and projects an image conjugate to the image generated by the image generating element as a projected image. The light source, the image generating unit, and the first optical system are arranged side by side in series in a direction parallel with the projected image plane.

6 Claims, 16 Drawing Sheets

(56) References Cited

U.S. PATENT DOCUMENTS

| | | | |
|---|---|---|---|
| 5,749,641 A | 5/1998 | Brice et al. | |
| 5,816,675 A | 10/1998 | Brice et al. | |
| 7,455,409 B2 * | 11/2008 | Kim et al. | 353/37 |
| 8,113,664 B2 * | 2/2012 | Nagarekawa et al. | 353/78 |
| 8,128,238 B2 * | 3/2012 | Fujita et al. | 353/98 |
| 8,388,147 B2 * | 3/2013 | Murata et al. | 353/79 |
| 2004/0156117 A1 | 8/2004 | Takaura et al. | |
| 2005/0248731 A1 | 11/2005 | Jung et al. | |
| 2006/0126032 A1 | 6/2006 | Takaura et al. | |
| 2006/0164601 A1 | 7/2006 | Akiyama | |
| 2006/0221312 A1 | 10/2006 | Matsuura et al. | |
| 2007/0097337 A1 * | 5/2007 | Morikuni et al. | 353/99 |
| 2007/0120983 A1 | 5/2007 | Yamamoto et al. | |
| 2008/0218037 A1 | 9/2008 | Adachi et al. | |
| 2008/0218705 A1 | 9/2008 | Adachi et al. | |
| 2008/0218706 A1 | 9/2008 | Adachi et al. | |
| 2008/0218707 A1 | 9/2008 | Adachi et al. | |
| 2008/0304019 A1 | 12/2008 | Takaura et al. | |
| 2009/0015801 A1 | 1/2009 | Takaura et al. | |
| 2009/0015910 A1 | 1/2009 | Takaura et al. | |
| 2009/0021703 A1 * | 1/2009 | Takaura et al. | 353/99 |
| 2010/0039625 A1 | 2/2010 | Takaura et al. | |
| 2010/0195005 A1 * | 8/2010 | Negishi et al. | 349/8 |
| 2011/0038039 A1 | 2/2011 | Takaura et al. | |
| 2011/0063586 A1 * | 3/2011 | Amano et al. | 353/99 |

FOREIGN PATENT DOCUMENTS

| | | |
|---|---|---|
| JP | 11-500839 | 1/1999 |
| JP | 11-119343 | 4/1999 |
| JP | 11-281876 | 10/1999 |
| JP | 2005-84576 | 3/2005 |
| JP | 2005-338325 | 12/2005 |
| JP | 2006-285044 | 10/2006 |
| JP | 2008-96983 | 4/2008 |
| JP | 2008-134432 | 6/2008 |
| JP | 2008-250277 | 10/2008 |
| JP | 2008-292634 | 12/2008 |
| JP | 2010-15180 | 1/2010 |
| JP | 2010-020344 | 1/2010 |
| WO | WO97/27512 A1 | 7/1997 |
| WO | WO 2009/142108 A1 | 11/2009 |

OTHER PUBLICATIONS

The Extended European Search Report issued Jan. 22, 2013, in Application No. / Patent No. 12184113.4-2216.

Japanese Office Action issued Jul. 25, 2014, in Japan Patent Application No. 2011-203430.

Chinese Office Action issued in Chinese patent application No. 201210430486.3 on Jul. 1, 2014.

Office Action issued Oct. 24, 2014 in Japanese Patent Application No. 2011-203430.

* cited by examiner

IMAGE PROJECTION APPARATUS

CROSS-REFERENCE TO RELATED APPLICATIONS

The present application claims priority to and incorporates by reference the entire contents of Japanese Patent Application No. 2011-203430 filed in Japan on Sep. 16, 2011.

BACKGROUND OF THE INVENTION

1. Field of the Invention

The present invention relates to an image projection apparatus such as a projector.

2. Description of the Related Art

Heretofore, there has been known an image projection apparatus including a DMD (Digital Mirror Device) serving as an image generating element that generates an image based on image data supplied from a personal computer or the like; an lighting unit that irradiates the image generating element with light from a light source; and a projection optical system for forming an optical image, which is generated by the image generating element and the lighting unit, on a projection plane (for example, Japanese Patent Application Laid-open No. 2008-134432).

Specifically, the light from the light source which travels in parallel with an image generation surface of the DMD is reflected toward the image generation surface of the DMD by an illumination optical system, such as a reflection mirror, and is applied onto the image generation surface of the DMD. On the imaging generation surface of the DMD, a plurality of movable micromirrors is arranged in a lattice. Each micromirror allows the mirror surface thereof to be inclined about a torsion axis by a predetermined angle, and allows the mirror surface to have two states of "ON" and "OFF". When the micromirror is in the "ON" state, the micromirror reflects light from the light source toward the projection optical system. When the micromirror is in the "OFF" state, the mirror reflects the light from the light source toward a light absorber provided in the apparatus. Accordingly, individually driving the mirrors makes it possible to control the projection of light for each pixel of image data and to generate an optical image. The optical image generated by the DMD passes through the projection optical system and is formed on the projection plane.

Additionally, Japanese Patent Application Laid-open No. 2008-250277 discloses an image projection apparatus including a projection optical system composed of a first optical system formed of a plurality of lenses and a second optical system including a concave mirror. In the image projection apparatus disclosed in Japanese Patent Application Laid-open No. 2008-250277, the first optical system forms an intermediate optical image conjugate to the optical image generated by the image generating element between the first optical system and the second optical system, and the second optical system enlarges and projects an image conjugate to the intermediate optical image the intermediate optical image on the projection plane. The configuration of the projection optical system as described above achieves point-blank projection.

FIG. 17 is a diagram illustrating a usage example of the image projection apparatus disclosed in Japanese Patent Application Laid-open No. 2008-250277.

As illustrated in FIG. 17, in the image projection apparatus disclosed in Japanese Patent Application Laid-open No. 2008-250277, the optical image generated by an image generating element 12 advances in a direction orthogonal to a projection plane (screen) 101, passes through a first optical system 70, and is reflected by a concave mirror 42 serving as the second optical system and projected on the projection plane.

As illustrated in FIG. 17, the image projection apparatus is generally used in the state of being placed on a desk 100 or the like which is opposed to the projection plane 101. The desk, chair, and the like used by a user are also arranged to be opposed to the projection plane 101. As disclosed in Japanese Patent Application Laid-open No. 2008-250277, an image projection apparatus 1A in which the image generating element 12, an illumination unit 20, and the first optical system 70 are arranged side by side in series in the direction orthogonal to the plane of a projected image projected on the projection plane 101 is elongated in the direction (X-direction in the figure) orthogonal to the projected image plane. Thus, when the image projection apparatus 1A is elongated in the direction orthogonal to the projected image plane, an installation space for the image projection apparatus 1A is required in the direction orthogonal to the projection plane 101. As a result, in a narrow indoor space, a sufficient space cannot be secured in the direction orthogonal to the projection plane 101, and the layout space for the desk and chair used by the user is limited. This results in a problem of impairing the convenience. Note that the phrase "arranged side by side in series" described above and below refers to an arrangement in which, on an optical path of outgoing light of an optical system formed of a certain optical element or a plurality of optical elements, the incidence plane of another optical system formed of another optical element or a plurality of optical elements is arranged.

In the above description, the case where the image projection apparatus is used by being placed on the desk 100 or the like has been described. However, even in the case where the image projection apparatus is used by being hung from the ceiling or the like, when the image projection apparatus is elongated in the direction orthogonal to the projection plane 101, the convenience is impaired for the following reason. That is, in the case of installing the image projection apparatus on the ceiling, the image projection apparatus may interfere with lighting equipment or the like arranged on the ceiling, so that the installation space for the image projection apparatus is limited and the convenience is impaired.

The present invention has been made in view of the above-mentioned problem, and it is an object of the present invention to provide an image projection apparatus capable of shortening the length in the direction orthogonal to the projection plane of the apparatus, as compared with the related art.

SUMMARY OF THE INVENTION

It is an object of the present invention to at least partially solve the problems in the conventional technology.

An image projection apparatus comprising: a light source; an image generating unit that generates an image by using the light source; and a projection optical unit that projects the image generated by the image generating unit.

The image generating unit and the projection optical unit are arranged in a vertical direction, the light source is arranged beside the image generating unit, and the projection optical unit projects the image on a plane positioned in a direction orthogonal to the vertical direction.

The above-mentioned image generating unit corresponds to the after-mentioned illumination unit 20 that reflects light from a light source 61 and irradiates a DMD 12 with the light to generate an optical image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
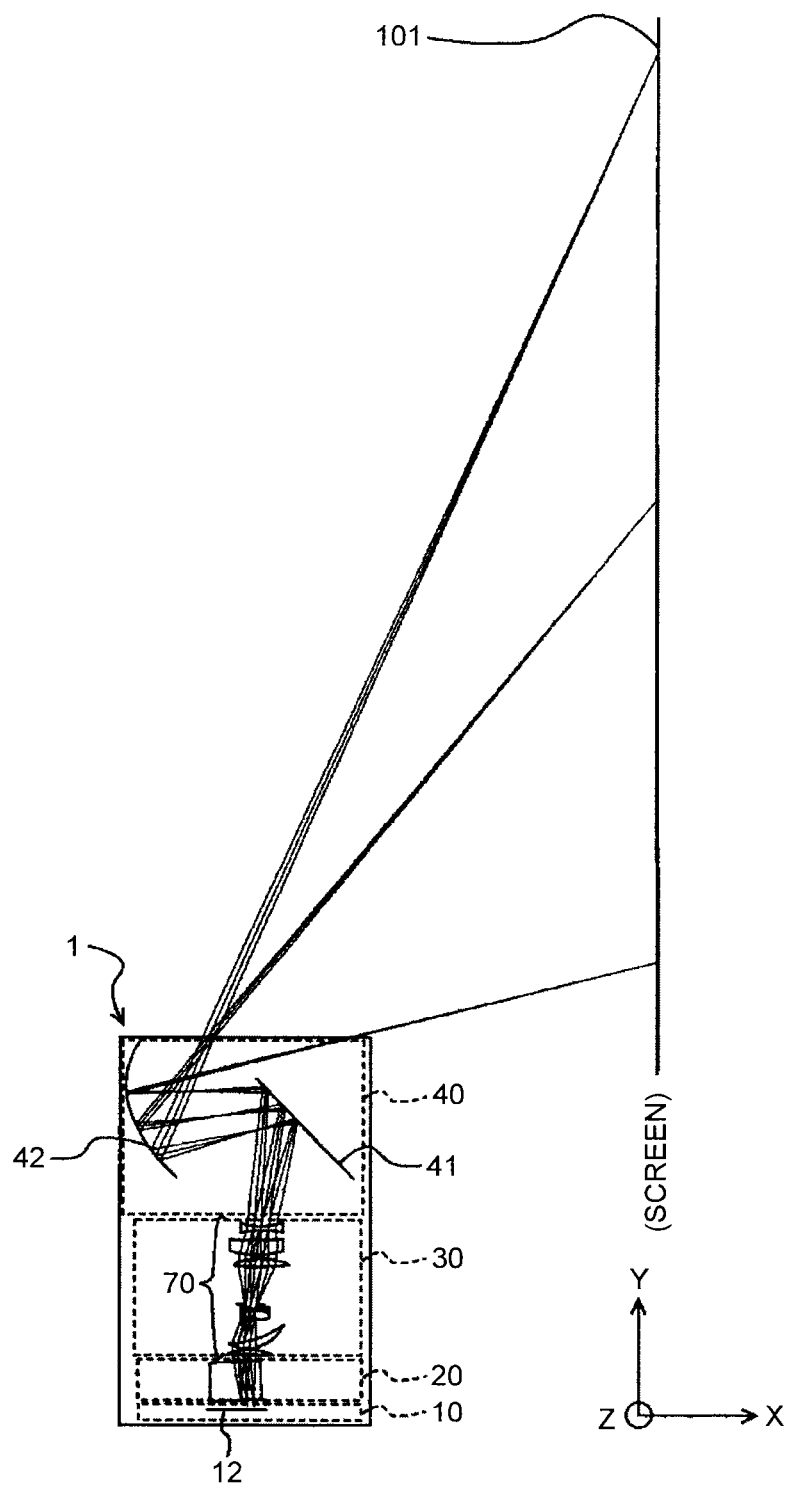
FIG. 1 is a diagram illustrating an optical path from a projector to a projection plane of this embodiment.
Figure 2:
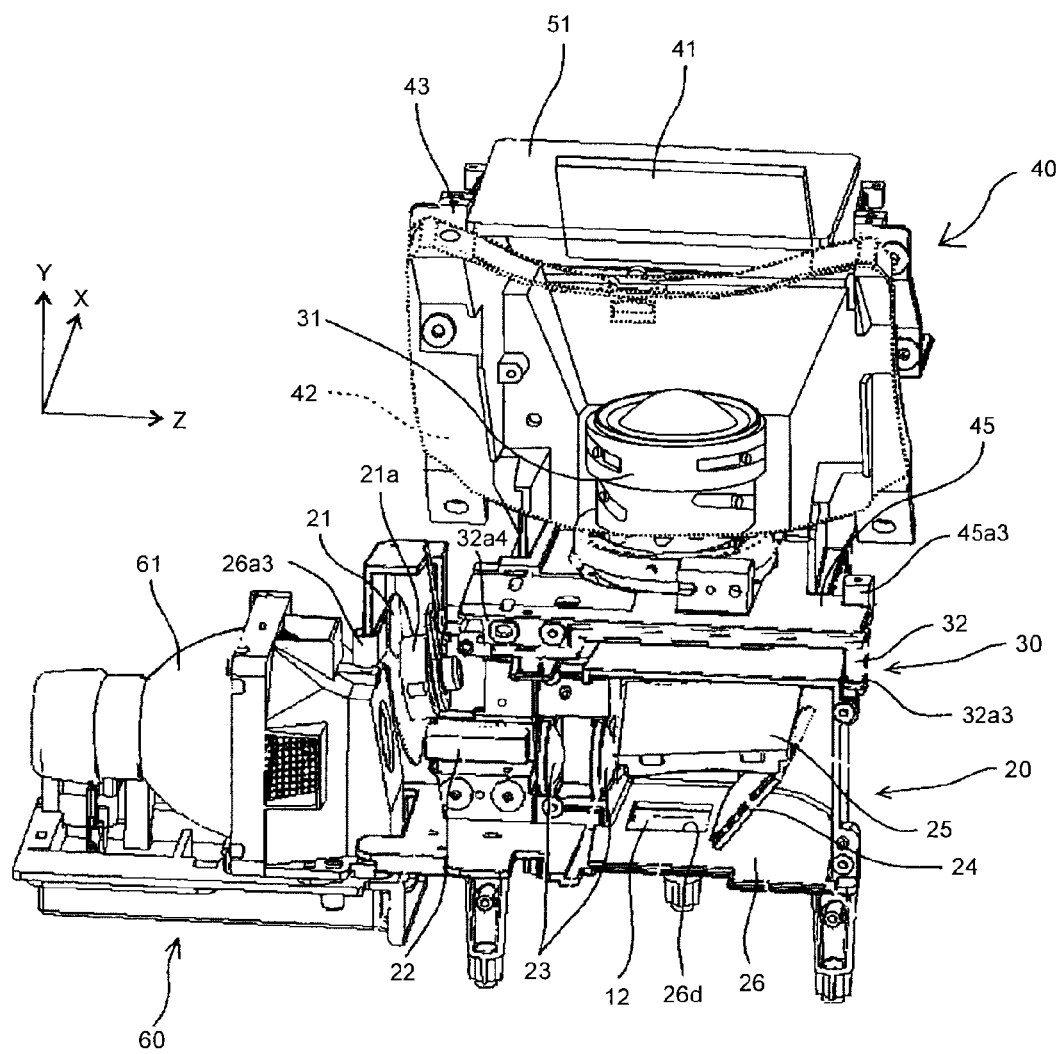
FIG. 2 is a schematic perspective view illustrating the configuration of the projector.
Figure 3:
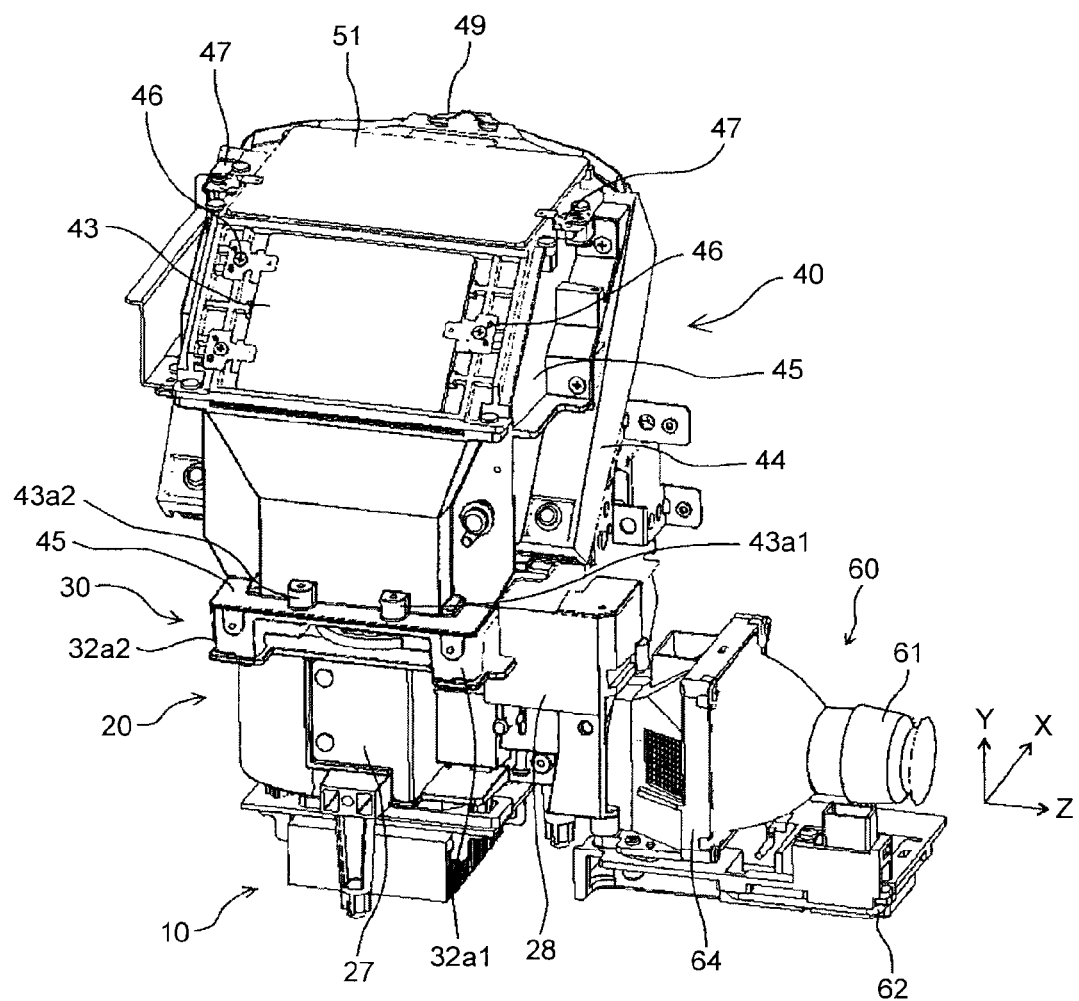
FIG. 3 is an appearance perspective view illustrating a relevant portion of the projector.

Hereinafter, an embodiment of a projector will be described as an image projection apparatus to which the present invention is applied. FIG. 1 is a diagram illustrating an optical path from a projector 1 to a projection plane 101 according to this embodiment. FIG. 2 is a schematic perspective view illustrating the configuration of the projector 1. FIG. 3 is an appearance perspective view illustrating a relevant portion of the projector 1. Note that in the following description, assume that the normal direction of the projection plane 101 is defined as an X-direction; the short-axis direction (vertical direction) of the projection plane is defined as a Y-direction; and the long-axis direction (horizontal direction) of the projection plane 101 is defined as a Z-direction.

As illustrated in FIGS. 1 to 3, the projector 1 includes an image generating unit 10, which includes a DMD 12 (Digital Mirror Device) serving as an image generating element; a light source unit 60 including a light source 61; an illumination unit 20 that reflects light from the light source 61 and irradiates the DMD 12 with the light to generate an optical image; and a projection optical system for projecting the image on the projection plane 101. The projection optical system includes a first optical system unit 30 serving as a coaxial system including at least one refractive optical system and having positive power, and a second optical system unit 40 including at least one reflecting surface having positive power.

Figure 4:
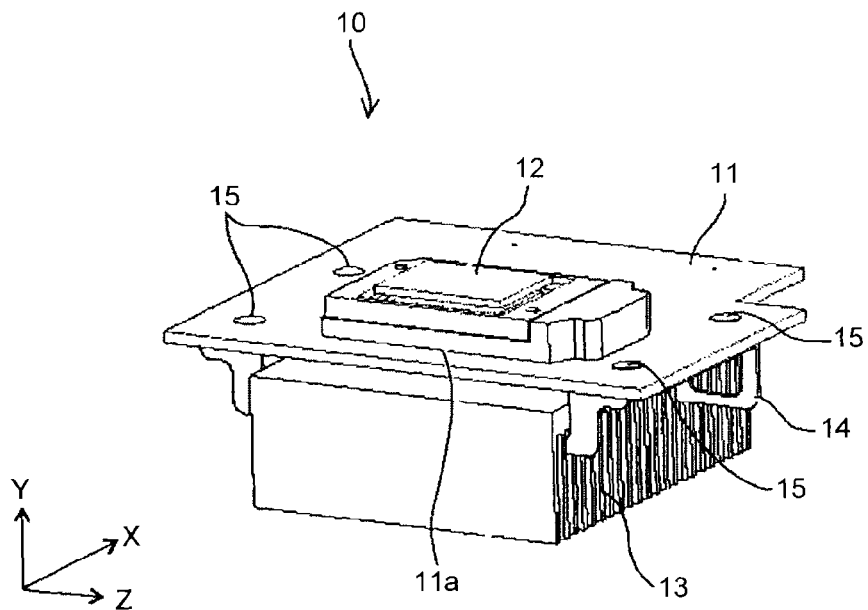
FIG. 4 is a perspective view of an image generating unit.

FIG. 4 is a perspective view of the image generating unit 10.

As illustrated in the figure, the image generating unit 10 includes a DMD board 11 mounted with the DMD 12. The DMD 12 is mounted on a socket 11a which is provided on the DMD board 11 with the image generation surface, on which the micromirrors are arranged in a lattice, facing upward. The DMD board 11 is provided with a drive circuit for driving the DMD mirrors, for example. A section in which the DMD 12 of the DMD board 11 is mounted is penetrated, and a heat sink 13 serving as cooling means for cooling the DMD 12 contacts the back surface (surface opposite to the image generation surface) of the DMD 12 through a through-hole which is not illustrated. The heat sink 13 is pressurized by a clamping plate 14 against the surface opposite to the surface on which the socket 11a of the DMD board 11 is provided. The clamping plate 14 is fixed to the DMD board 11 at four sections by screws 15, thereby allowing the heat sink 13 to be fixed to the DMD board 11.

Figure 5:
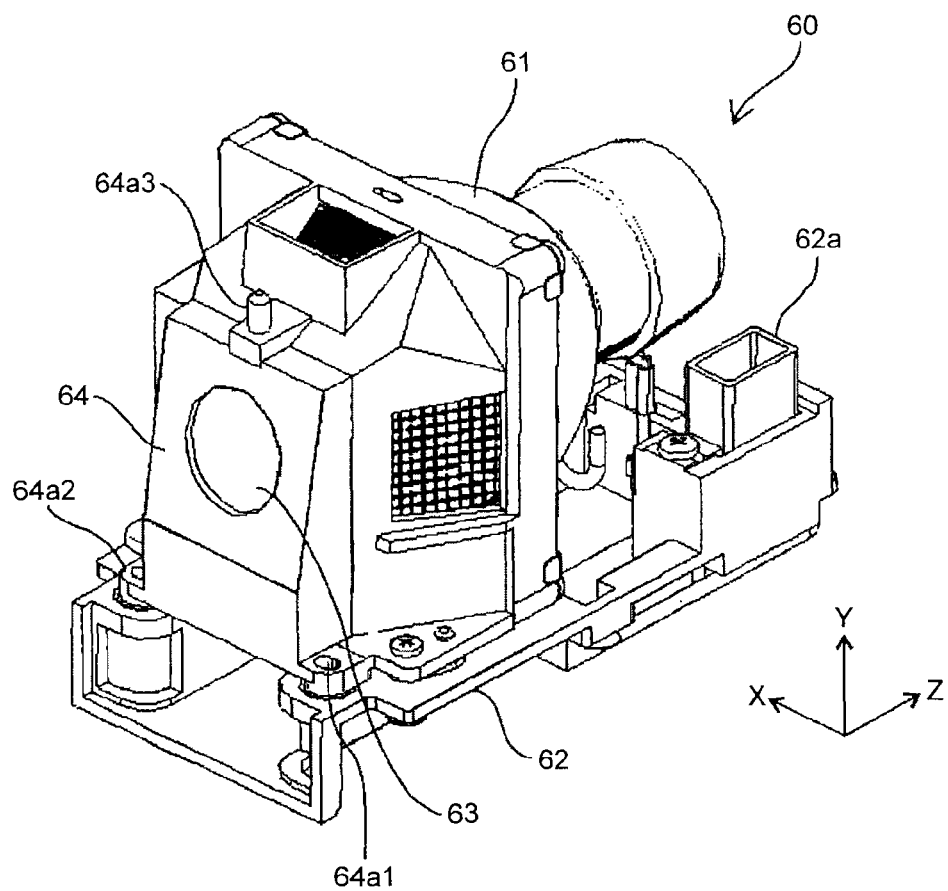
FIG. 5 is a schematic perspective view of a light source unit.

FIG. 5 is a schematic perspective view of the light source unit 60.

The light source unit 60 includes a light source bracket 62 which is mounted with the light source 61 such as a halogen lamp, a metal halide lamp, or a high-pressure mercury lamp. This light source bracket 62 is provided with a connector unit 62a to be connected to a power-supply-side connector which is not illustrated and which is connected to a power supply unit 80 (see FIG. 15).

The light source unit 60 also includes a holder 64 that holds a reflector, which is not illustrated, and the like. The holder 64 is screwed into the light source bracket 62. The holder 64 is provided with three light source positioning units 64a1 to 64a3 for positioning on an illumination bracket 26 of the illumination unit 20 to be described later. The light source positioning unit 64a3 provided on the top surface of the holder 64 has a protrusion shape, and the two light source positioning units 64a1 and 64a2 provided on the side of the light source bracket 62 of the holder 64 have a hole shape. The illumination bracket 26 of the illumination unit 20 includes a light source positioned unit 26a3 which has a hole shape and which is fitted with the light source positioning unit 64a3 which has a protrusion shape and which is provided on the top surface of the holder 64; and two light source positioned units 26a1 and 26a2 which have a protrusion shape and which are fitted with the two light source positioning units 64a1 and 64a2 which have a hole shape and which are provided on the side of the light source bracket 62 of the holder 64 (see FIG. 9). The three light source positioning units 64a1 to 64a3 of the holder 64 are fitted into the three light source positioned units 26a1 to 26a3 which are provided on the illumination bracket 26 of the illumination unit 20, thereby allowing the light source unit 60 to be positioned and fixed onto the illumination unit 20. The light source unit 60 is configured to be detachable from the back surface of the apparatus body.

Figure 6:
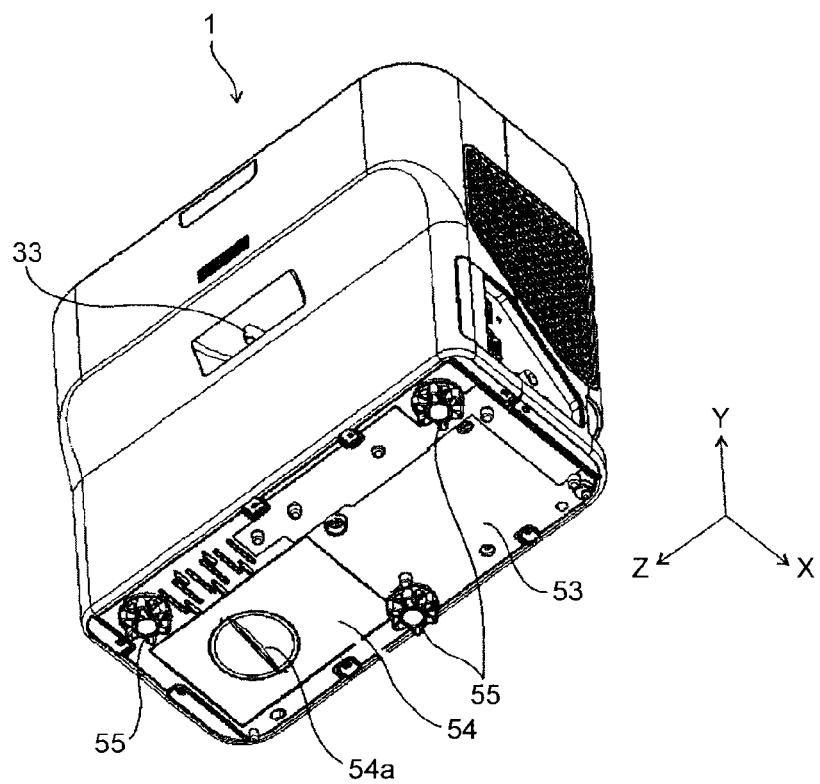
FIG. 6 is a perspective view illustrating a bottom surface of a projector 1.
Figure 7:
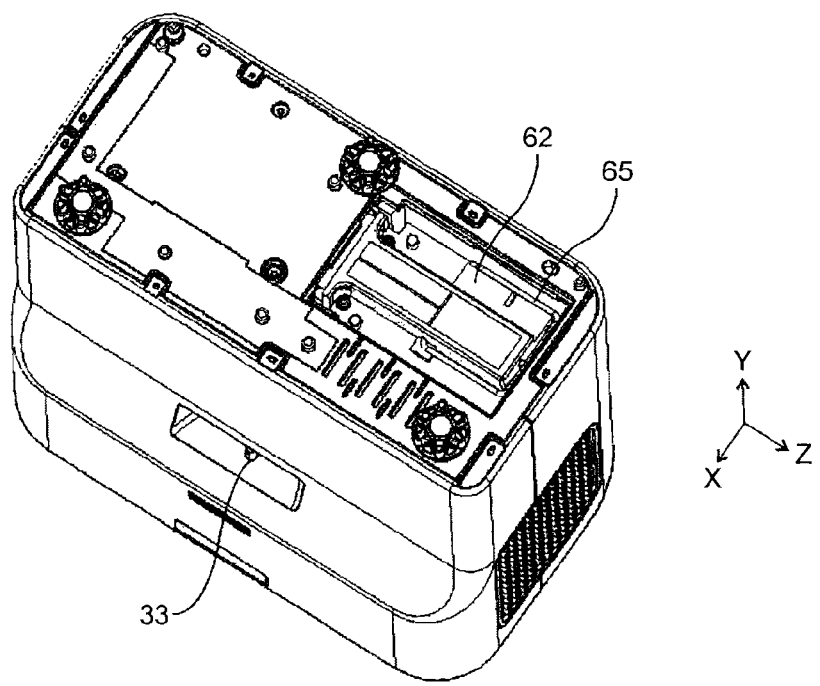
FIG. 7 is a perspective view illustrating a state where a light source replacement cap from an apparatus.

FIG. 6 is a perspective view illustrating a bottom surface 53 of the projector 1. FIG. 7 is a perspective view illustrating a state where a light source replacement cap 54 is dismounted from the apparatus.

As illustrated in FIG. 6, the light source replacement cap 54 is provided on the bottom surface of the projector 1, and the light source replacement cap 54 is provided with a rotary lever 54a. When the rotary lever 54a is rotated, the fixation between the light source replacement cap 54 and the apparatus body is released to thereby allow the light source replacement cap 54 to be removed from the apparatus body. When the light source replacement cap 54 is removed, the surface opposite to the surface where the light source 61 of the light source bracket 62 of the light source unit 60 is mounted is exposed. The light source bracket 62 is mounted with a handle unit 65 so as to be rotatable with respect to the light source bracket 62.

In the case of dismounting the light source unit 60 from the apparatus body, the handle unit 65 is rotated and gripped so as to be drawn to the front side in the figure, thereby dismounting the light source unit 60 from the apparatus body. When a brand-new light source unit 60 is mounted on the apparatus body, the connector unit 62a is connected to the power-supply-side connector, which is not illustrated, of the apparatus body, and the three light source positioning units 64a1 to 64a3 of the holder 64 are fitted into the light source positioned units 26a1-26a3 provided on the illumination bracket 26 of the illumination unit 20, thereby positioning the light source unit 60 onto the apparatus body. Then, the light source replacement cap 54 is mounted on the bottom surface. The light source replacement cap 54 is provided with a pressing unit (not illustrated) for pressing the light source unit 60 into the apparatus body. If the light source unit 60 is not properly mounted on the apparatus body, the light source unit 60 is pressed in by the pressing unit upon mounting of the light source replacement cap 54 on the bottom surface, thereby properly mounting the light source unit 60 on the apparatus body. Then, the rotary lever 54a is rotated to fix the light source replacement cap 54 to the bottom surface.

The bottom surface 53 is provided with three leg portions 55. The rotation of the leg portions 55 enables change of the amount of projection from the bottom surface and adjustment in the height direction (Y-direction).

Next, the illumination unit 20 will be described.

Figure 8:
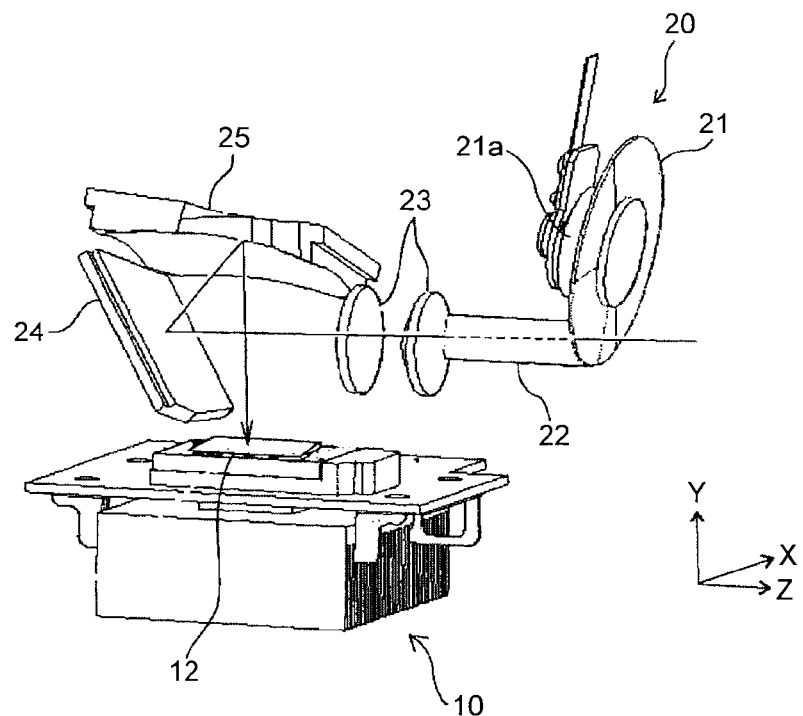
FIG. 8 is a schematic perspective view illustrating optical components arranged in an illumination unit.
Figure 9:
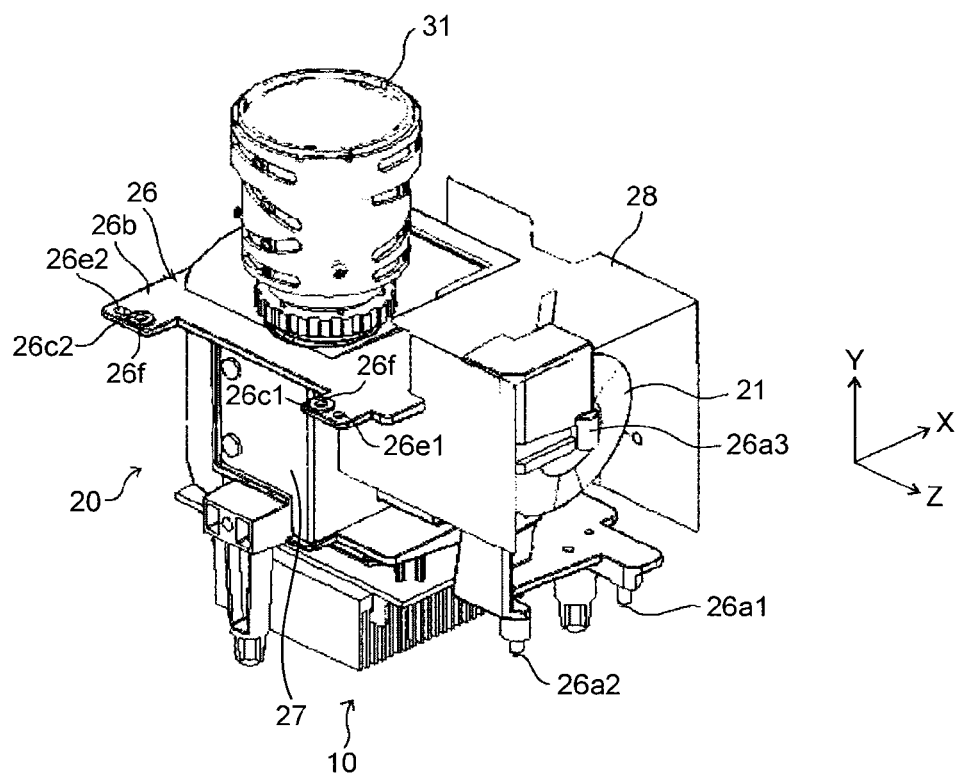
FIG. 9 is a perspective view illustrating the illumination unit, the image generating unit, and a projection lens unit of a first optical system unit.

FIG. 8 is a schematic perspective view illustrating optical components arranged in the illumination unit 20. FIG. 9 is a perspective view illustrating the illumination unit 20, the image generating unit 10, a projection lens unit 31 of the first optical system unit 30.

The illumination unit 20 includes a color wheel 21, a light tunnel 22, two relay lenses 23, a cylinder mirror 24, and a concave mirror 25. These components are held by the illumination bracket 26. As illustrated in FIG. 9, the illumination bracket 26 also includes an OFF optical plate 27 which is irradiated with light when the micromirrors of the DMD 12 are in the "OFF" state.

As illustrated in FIG. 2, an irradiation through-hole 26d for exposing the DMD 12 is provided in the lower surface of the illumination bracket 26. The image generating unit 10 is positioned and fixed onto the illumination bracket 26 by screws.

As illustrated in FIG. 9, through-holes 26c1 to 26c4 through which screws for screwing the first optical system unit 30 are provided in the vicinity of four corners of a top surface 26b of the illumination bracket 26 (FIG. 9 illustrates 26c1 and 26c2). Additionally, positioning holes 26e1 and 26e2 for positioning the first optical system unit 30 on the illumination unit 20 are provided adjacent to the through-holes 26c1 and 26c2 on the side where the OFF optical plate 27 is arranged. A notch is formed between the through-holes 26c1 and 26c2 of the top surface 26b of the illumination bracket 26 so as to prevent interference with the second optical system unit 40 to be screwed into the first optical system unit 30. The positioning hole 26e1 formed on the side where the color wheel 21 is arranged is a main reference for positioning and has a round hole shape. The positioning hole 26e2 formed on the side opposite to the side where the color wheel 21 is arranged is a sub reference for positioning and is a long hole extending in the Z-direction. In the vicinity of the through-holes 26c1 to 26c4, there are positioning protrusions 26f which project from the top surface 26b of the illumination bracket 26 and are used for positioning the first optical system unit 30 in the Y-direction. In the case of increasing the positioning accuracy in the Y-direction without providing the positioning protrusions 26f, it is necessary to increase the flatness of the entire top surface of the illumination bracket 26, which leads to an increase in cost. On the other hand, when the positioning protrusions 26f are provided, it is only necessary to increase the flatness of the portion of the positioning protrusions 26f. This makes it possible to suppress an increase in cost and to increase the positioning accuracy in the Y-direction.

The illumination unit 20 also includes an illumination cover 28 that covers the optical system components such as the color wheel 21 and the light tunnel 22.

The color wheel 21 has a disc shape and is fixed to a motor shaft of a color motor 21a. The color wheel 21 is provided with filters of R (red), G (green), B (blue), or the like in a rotational direction. The light focused by a reflector which is not illustrated and which is provided on the holder 64 of the light source unit 60 passes through an exit window 63 and reaches a peripheral edge of the color wheel 21. The light is separated into R, G, and B light beams by time division through the rotation of the color wheel 21.

The light beams separated by the color wheel 21 enter the light tunnel 22. The light tunnel 22 has a square cylinder shape, and the inner peripheral surface thereof is a mirror surface. The light beams entering the light tunnel 22 are reflected a plurality of times on the inner peripheral surface of the light tunnel 22, are made into a uniform surface light source, and exit toward the relay lenses 23.

The light having passed through the light tunnel 22 is transmitted through the two relay lenses 23, is reflected by the cylinder mirror 24 and the concave mirror 25, and is focused on the image generation surface of the DMD 12.

A plurality of movable micromirrors is arranged in a lattice on the image generation surface of the DMD 12. Each micromirror allows the mirror surface thereof to be inclined about a torsion axis by a predetermined angle, and allows the mirror surface to have two states of "ON" and "OFF". In the "ON" state, the micromirror reflects the light from the light source 61 toward the first optical system 70 (see FIG. 1). In the "OFF" state, the micromirror reflects the light from the light source 61 toward the OFF optical plate 27 (see FIG. 9) provided on the illumination unit 20. Accordingly, individually driving the mirrors enables control of the projection of light for each pixel of image data and generation of an optical image.

The light reflected toward the OFF optical plate 27 is converted into heat to be absorbed and cooled by a flow of outside air.

Figure 10:
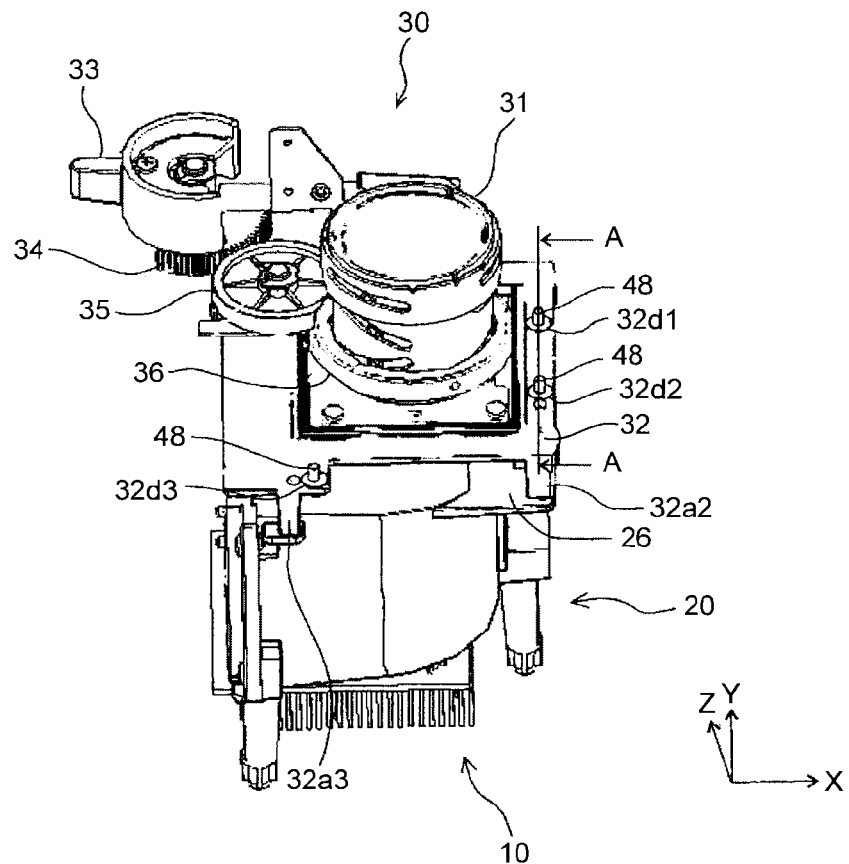
FIG. 10 is a perspective view illustrating the first optical system unit, as well as the illumination unit and the image generating unit.

FIG. 10 is a perspective view illustrating the first optical system unit 30, the illumination unit 20, and the image generating unit 10.

As illustrated in FIG. 10, the first optical system unit 30 includes the projection lens unit 31 that holds the first optical system 70 (see FIG. 1) formed of a plurality of lenses, and a lens holder 32 that holds the projection lens unit 31. The lens holder 32 is provided with four leg portions 32a1 to 32a4, and the leg portions 32a1 to 32a4 have screw holes for allowing the leg portions to be screwed into the illumination bracket 26.

Figure 11:
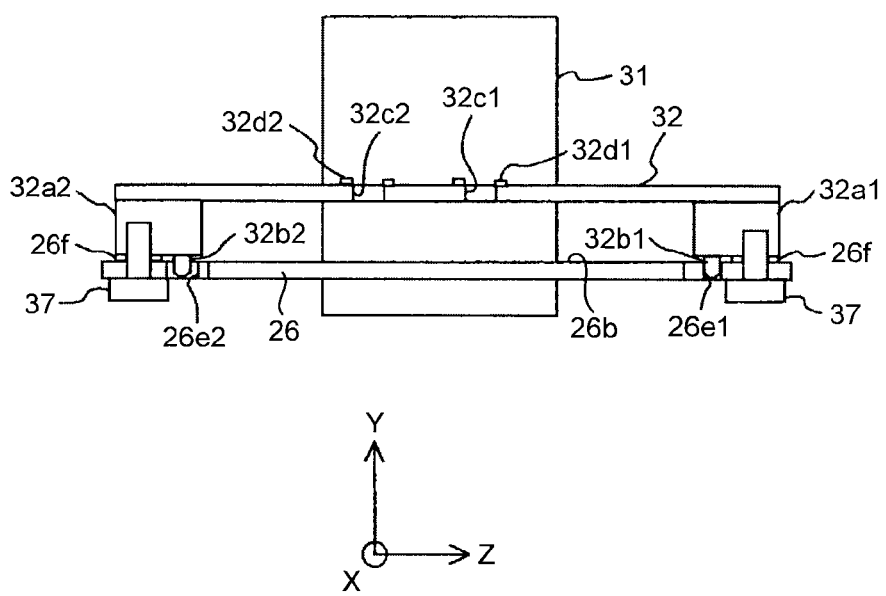
FIG. 11 is a sectional view taken along the line A-A of FIG. 10.

FIG. 11 is a sectional view taken along the line A-A of FIG. 10.

As illustrated in FIG. 11, the leg portions 32a1 and 32a2 (see FIG. 3) on the side of the OFF optical plate 27 are provided with positioned protrusions 32b1 and 32b2, respectively. The positioned protrusion 32b1 on the right side of the figure is inserted into the positioning hole 26e1 which has a round hole shape provided in the top surface 26b of the illumination bracket 26 and serves as the main reference for positioning. The positioned protrusion 32b2 on the left side of the figure is inserted into the positioning hole 26e2 which serves as the sub reference for positioning and which has a long hole shape. Thus, the positioning in each of the Z-axis direction and the X-axis direction is achieved. When screws 37 are inserted into the through-holes 26c1 to 26c4, which are formed in the top surface 26b of the illumination bracket 26, and the screws 37 are screwed into the screw holes formed in the lens holder 32, thereby positioning and fixing the first optical system unit 30 onto the illumination unit 20.

As illustrated in FIG. 10 described above, the projection lens unit 31 is provided with a focus gear 36, and the focus gear 36 engages with an idler gear 35. The idler gear 35 engages with a lever gear 34. A focus lever 33 is fixed to the rotating shaft of the lever gear 34. A leading end of the focus lever 33 is exposed from the apparatus body as illustrated in FIG. 6 described above.

When the focus lever 33 is moved, the focus gear 36 rotates through the lever gear 34 and the idler gear 35. When the focus gear 36 is rotated, the plurality of lenses forming the first optical system 70 within the projection lens unit 31 moves in a predetermined direction to thereby adjust the focus of the projected image.

As illustrated in FIGS. 10 and 11, the first optical system unit 30 has four screw through-holes 32c1 to 32c4 through which screws 48 for screwing the second optical system unit 40 into the first optical system unit 30 (FIG. 10 illustrates three screw through-holes and illustrates a state where the screws 48 are penetrated through the screw through-holes 32c1 to 32c4). In the vicinity of the screw through-holes 32c1 to 32c4, second optical system unit positioning protrusions 32d1 to 32d4 projecting from the surface of the lens holder 32 are formed (FIG. 10 illustrates 32d1 to 32d3).

Figure 12:
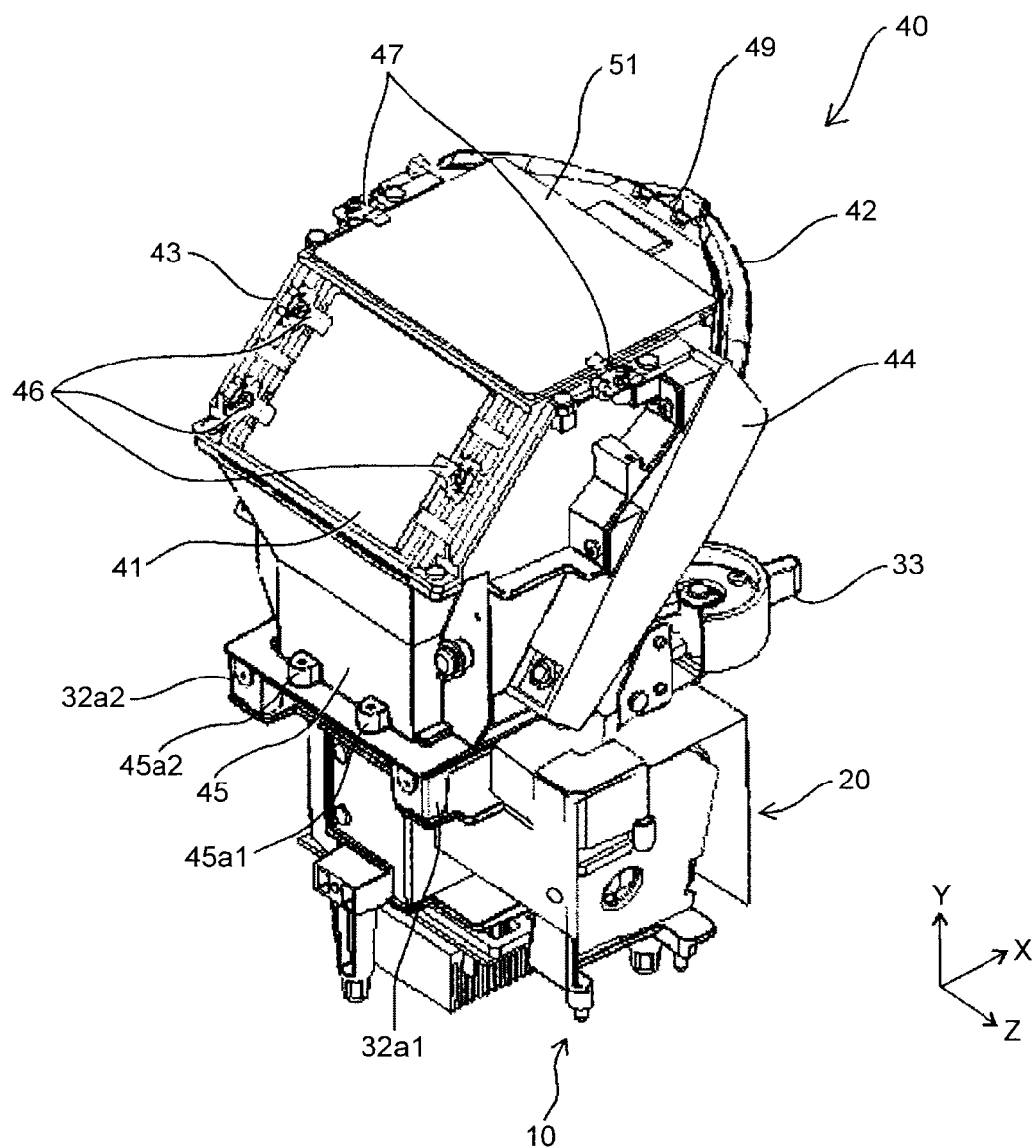
FIG. 12 is a perspective view illustrating a second optical system unit, as well as the first optical system unit, the illumination unit, and the image generating unit.
Figure 13:
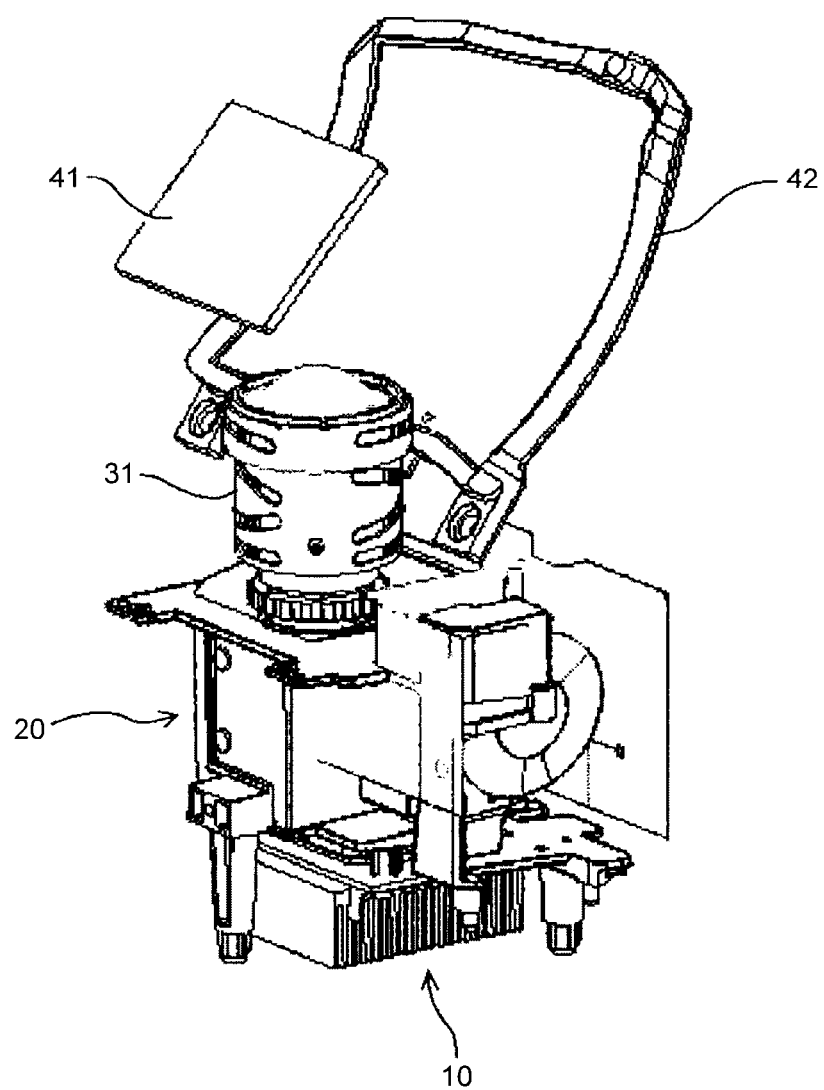
FIG. 13 is a perspective view illustrating a second optical system held by the second optical system unit, as well as the projection lens unit, the illumination unit, and the image generating unit.

FIG. 12 is a perspective view illustrating the second optical system unit 40, as well as the first optical system unit 30, the illumination unit 20, and the image generating unit 10. FIG. 13 is a perspective view illustrating a second optical system held by the second optical system unit 40, as well as the projection lens unit 31, the illumination unit 20, and the image generating unit 10.

The second optical system unit 40 holds a reflection mirror 41 constituting the second optical system, and a concave mirror 42 having a concave shape. The second optical system unit 40 also holds a transmitting glass 51 which allows the optical image reflected on the concave mirror 42 to be transmitted and which is used for dust proofing of the optical system components within the apparatus. The reflection mirror 41 and the transmitting glass 51 are held by a mirror bracket 43, and the concave mirror 42 is held by a free mirror bracket 44. The mirror bracket 43 and the free mirror bracket 44 are held by a mirror holder 45.

The reflection mirror 41 is positioned and fixed to the mirror bracket 43 in such a manner that both ends in the Z-direction of the reflection mirror 41 are pressed against the mirror bracket 43 by mirror pressing members 46 having a plate spring shape. One end in the Z-direction of the reflection mirror 41 is fixed by two mirror pressing members 46, and the other end thereof is fixed by one mirror pressing member 46.

The transmitting glass 51 is also positioned and fixed onto the mirror bracket 43 in such a manner that both ends in the Z-direction of the transmitting glass 51 are pressed against the mirror bracket 43 by glass pressing members 47 having a plate spring shape. Each of the both ends in the Z-direction of the transmitting glass 51 is fixed by one glass pressing member 47.

A substantially central portion of the concave mirror 42 at an end on the side of the transmitting glass 51 is pressed against the free mirror bracket 44 by a free mirror pressing member 49 having a plate spring shape, and the first optical system side is fixed to the free mirror bracket 44 by screws.

Cylindrical screw stops 45a1 to 45a4 for screwing the first optical system unit 30 are formed on the lower surface of the mirror holder 45 (as for the screw stops 45a1 and 45a2, see FIG. 12; as for the screw stop 45a3, see FIG. 2). The second optical system unit 40 allows the screws 48 to be penetrated through the screw through-holes 32c1 to 32c4 formed in the lens holder 32 of the first optical system unit 30. The screws 48 are screwed into the screw stops 45a1 to 45a4, thereby being screwed into the first optical system unit 30. At this time, the lower surface of the mirror holder 45 of the second optical system unit 40 contacts the second optical system unit positioning protrusions 32d1 to 32d4 of the lens holder 32, thereby positioning and fixing the second optical system unit 40 in the Y-direction.

Figure 14:
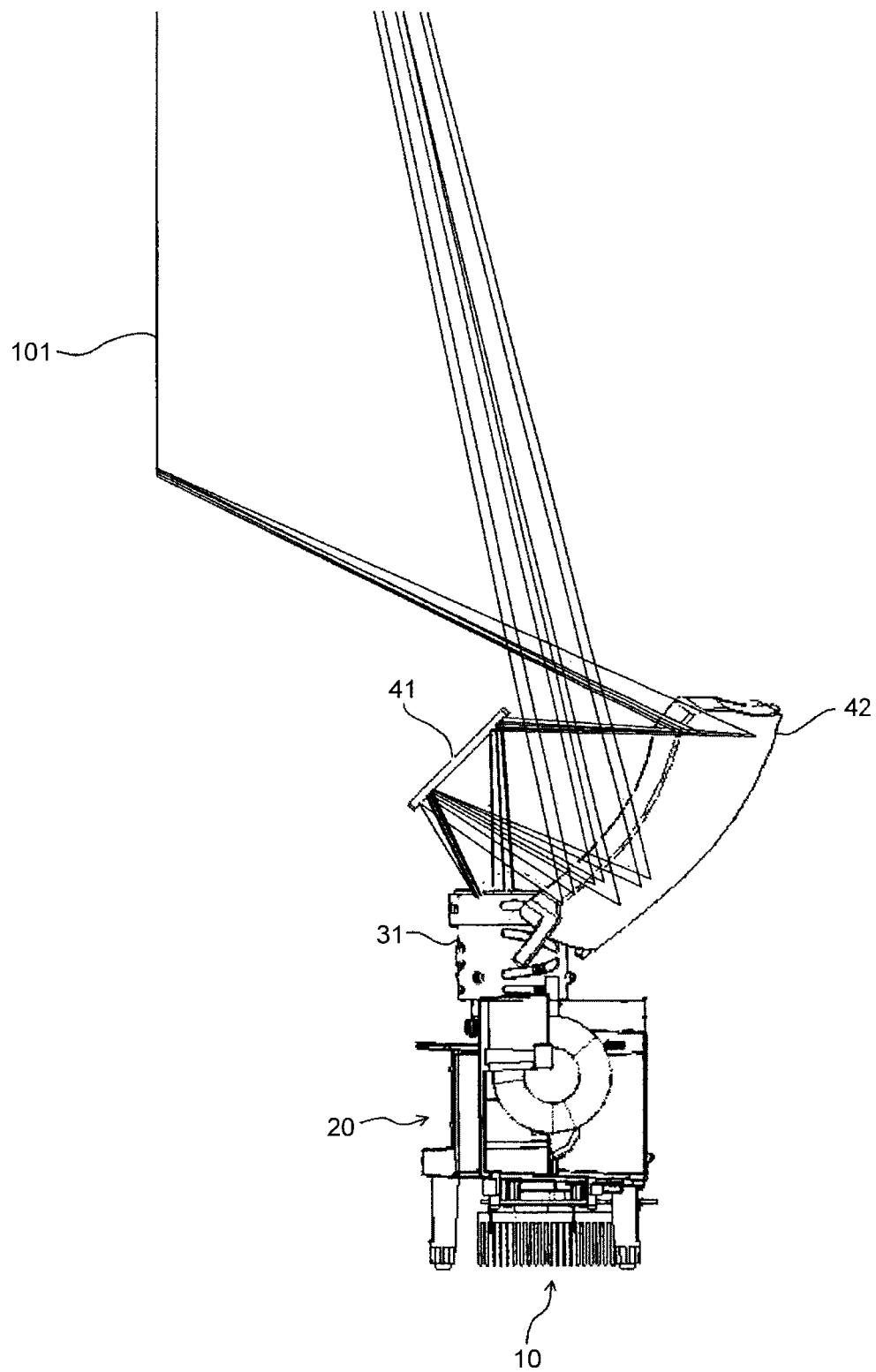
FIG. 14 is a perspective view illustrating an optical path from the first optical system to the projection plane.

FIG. 14 is a perspective view illustrating an optical path from the first optical system 70 to the projection plane 101 (screen).

The optical image transmitted through the projection lens unit 31 forming the first optical system 70 forms an intermediate image conjugate to the optical image generated by the DMD 12 between the reflection mirror 41 and the concave mirror 42. This intermediate image is formed as a curved surface image between the reflection mirror 41 and the concave mirror 42. Next, the optical image enters the concave mirror 42 having a concave shape, and the intermediate image is made into "a further enlarged image" by the concave mirror 42 and projected and focused on the projection plane 101.

In this manner, the projection optical system is formed of the first optical system 70 and the second optical system, and the intermediate image is formed between the first optical system 70 and the concave mirror 42 of the second optical system and is enlarged and projected by the concave mirror 42, thereby enabling shortening of the projection distance and use even in a narrow conference room, for example.

The surface reflecting the light of the concave mirror 42 can be formed into a spherical surface shape, a rotation symmetry aspherical surface shape, a free-form surface shape, or the like.

Figure 15:
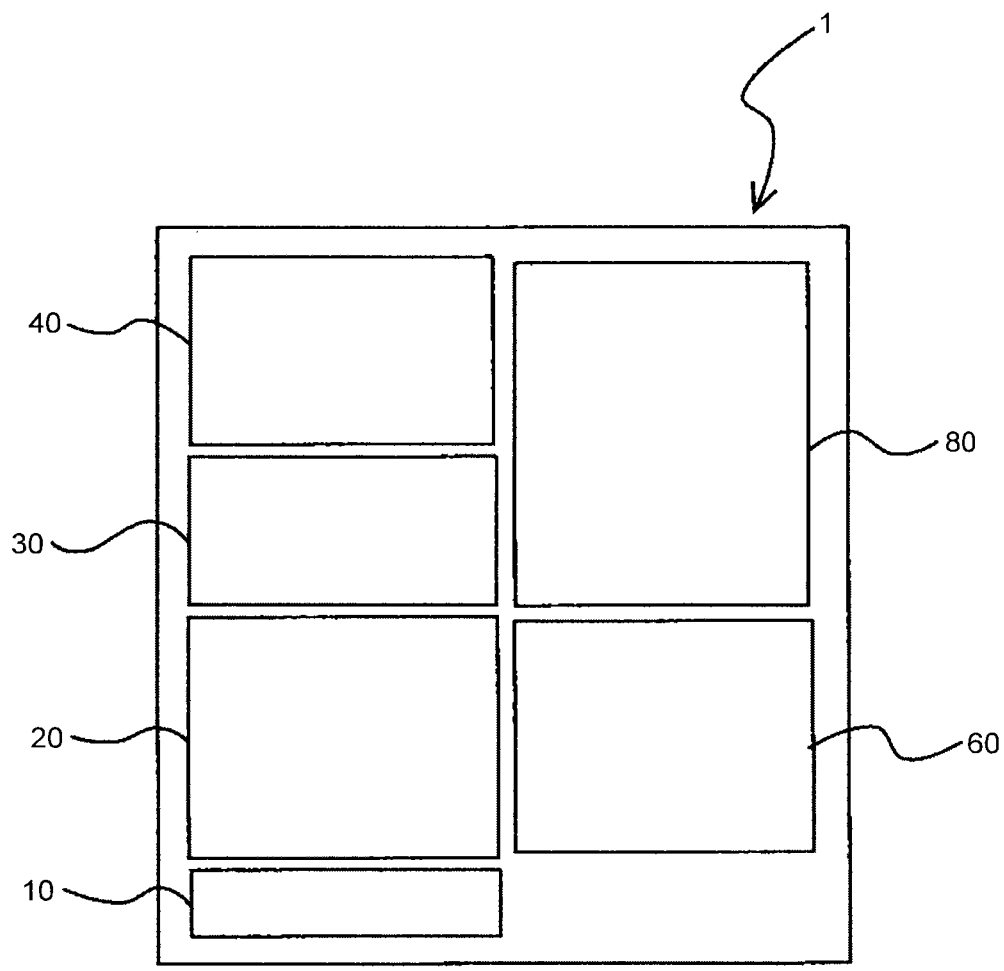
FIG. 15 is a schematic diagram illustrating the arrangement relationship among the units within the apparatus.
Figure 15:
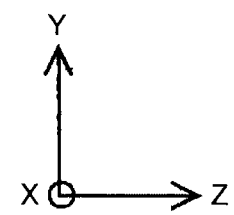

FIG. 15 is a schematic diagram illustrating the arrangement relationship among the units within the apparatus.

As illustrated in the figure, the image generating unit 10, the illumination unit 20, the first optical system unit 30, and the second optical system unit 40 are stacked and arranged in the Y-direction which is the short-axis direction of the projection plane. The light source unit 60 is arranged in the Z-direction, which is the long-axis direction of the projection plane, with respect to the stacked body obtained by stacking the image generating unit 10, the illumination unit 20, the first optical system unit 30, and the second optical system unit 40.

In the arrangement of the units in this manner, the light emitted from the light source 61 travels in the Z-direction parallel with the projection plane, is reflected by the cylinder mirror 24 and the concave mirror of the illumination unit 20 in the Y-direction parallel with the projection plane, and enters the DMD 12.

As illustrated in FIG. 1, the optical image generated by the DMD 12 travels in the Y-direction parallel with the projection plane, is transmitted through the first optical system 70 formed of a plurality of optical lenses, and enters the second reflection mirror 41. The light incident on the second reflection mirror 41 is reflected in the Z-direction orthogonal to the projection plane. The light is then reflected by the concave mirror 42 and is applied onto the projection plane 101. Thus, the second optical system is formed of the reflection mirror 41 and the concave mirror 42, thereby allowing the light transmitted through the first optical system 70 parallel with the projection plane 101 to be projected toward the projection plane 101.

Figure 16:
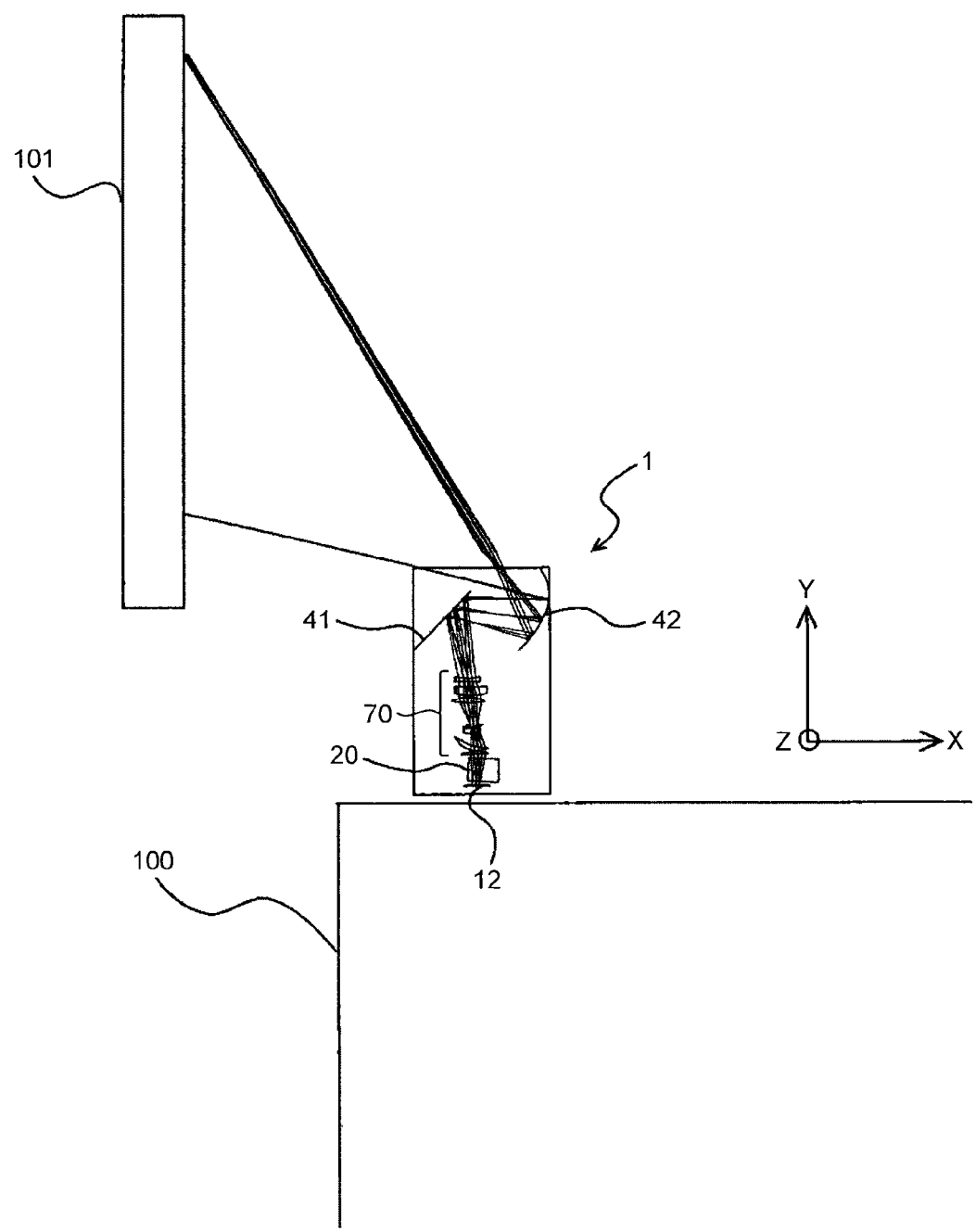
FIG. 16 is a diagram illustrating a usage example of the projector of this embodiment.
Figure 17:
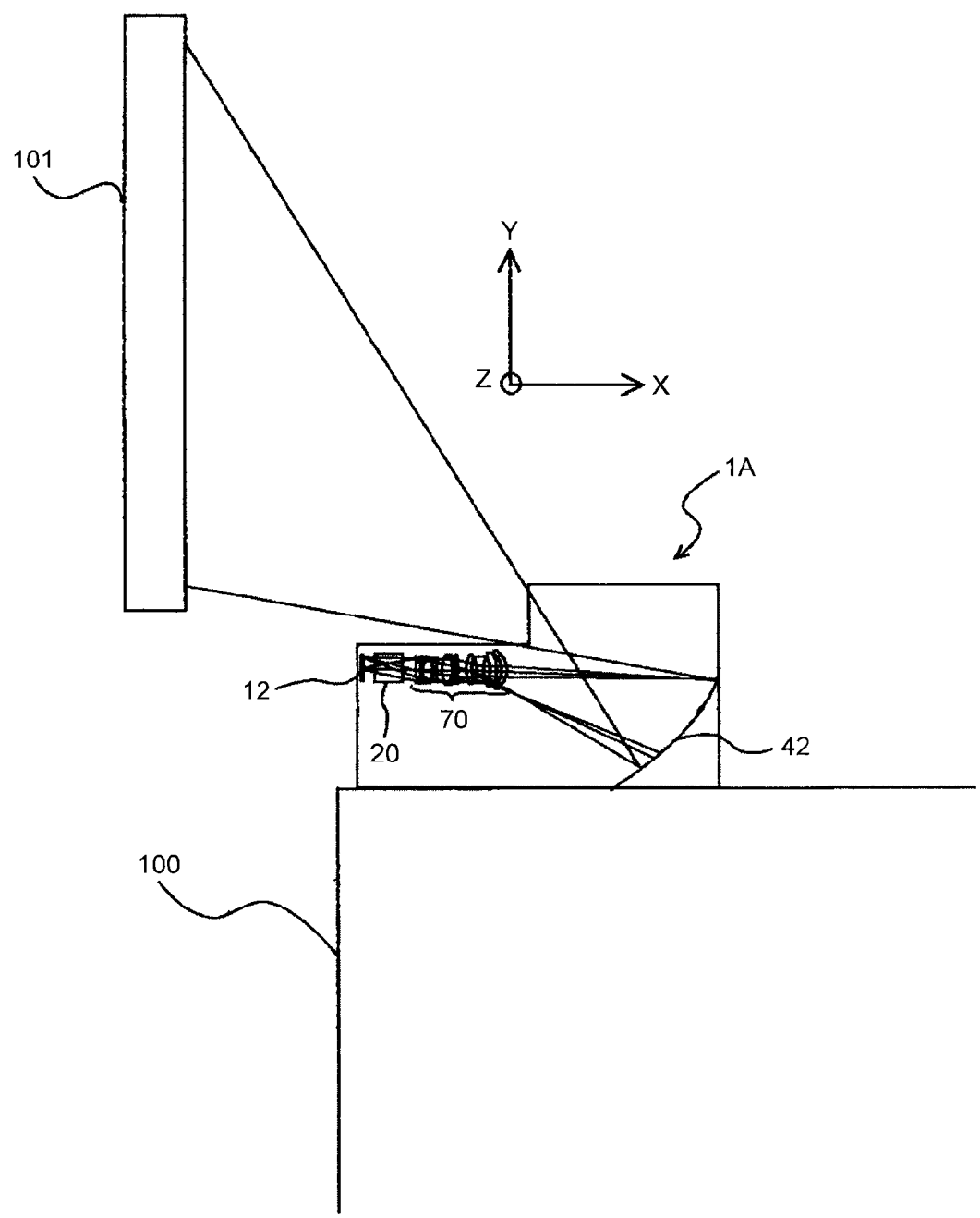
FIG. 17 is a diagram illustrating a usage example of a related art projector.
Figure 18:
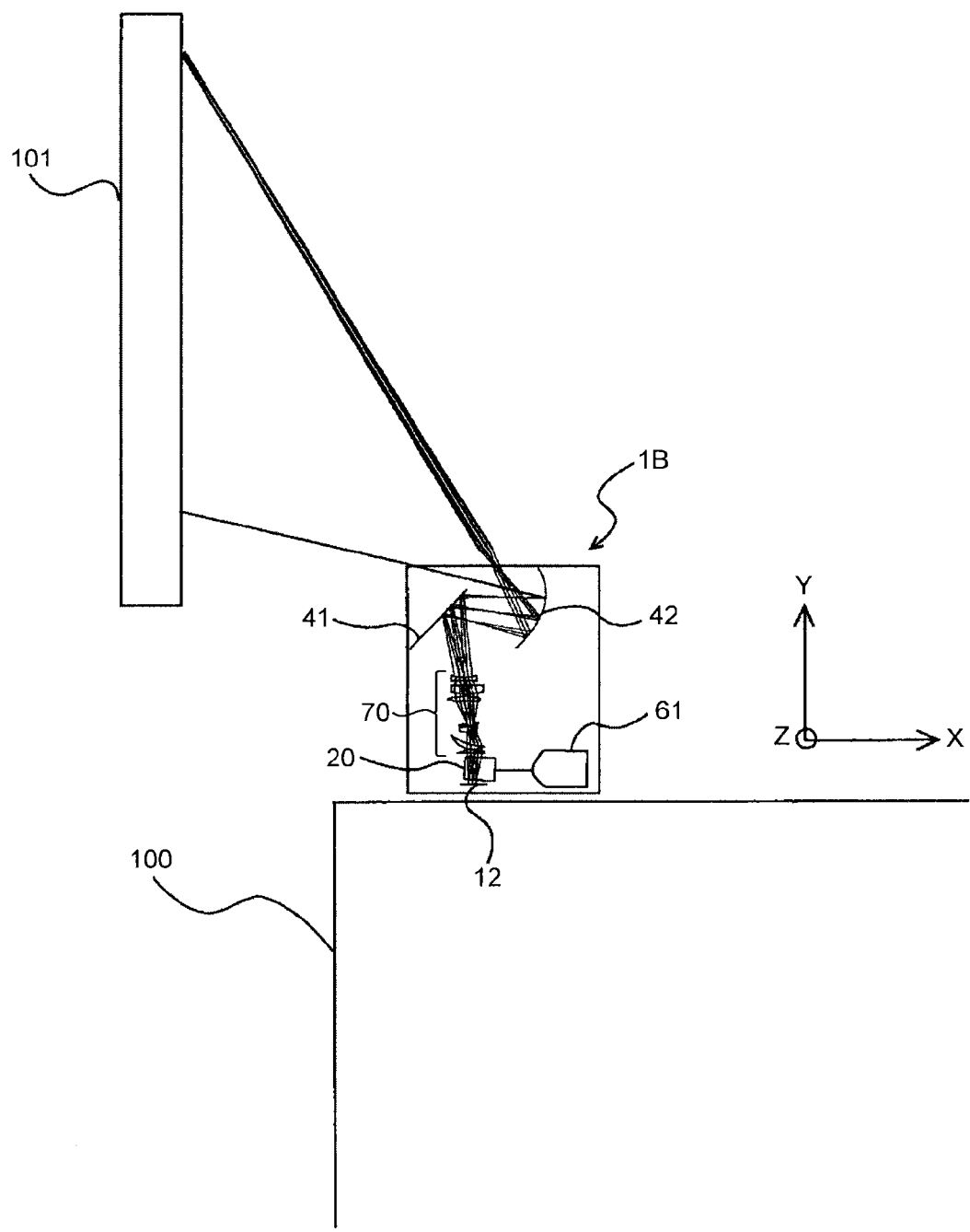
FIG. 18 is a diagram illustrating a usage example of a projector in which a light source and an illumination unit are arranged in a direction orthogonal to the projection plane.

FIG. 16 is a diagram illustrating a usage example of the projector 1 of this embodiment. FIG. 17 is a diagram illustrating a usage example of the related art projector 1A. FIG. 18 is a diagram illustrating a usage example of a projector 1B in which the light source 61 and the illumination unit 20 are arranged side by side in the direction orthogonal to the projection plane 101.

As illustrated in FIGS. 16 to 18, in the case of using the projector 1 in a conference room, for example, the projector 1 is placed on the table 100 and an image is projected on the projection plane 101 such as a white board.

As illustrated in FIG. 17, in the related art projector 1A, the DMD 12 (image generating element), the illumination unit 20, and the first optical system 70 are arranged side by side in series in the direction orthogonal to the projected image plane, so that the projector 1A is elongated in the direction (X-direction) orthogonal to the projection plane of the projector 1A and occupies a large space in the direction orthogonal to the projection plane 101. A chair to be used by a person who observes the image projected on the projection plane 101, or a desk to be used is generally arranged in the direction orthogonal to the projection plane. Accordingly, if the projector occupies a large space in the direction orthogonal to the projection plane, the layout space for the chair or desk is limited, resulting in deteriorating the convenience.

The projector 1B illustrated in FIG. 18 has a configuration in which the DMD 12 (image generating element), the illumination unit 20, and the first optical system 70 are arranged in series in a direction parallel with the projected image plane. Accordingly, as compared with the projector 1B illustrated in FIG. 17, the length in the direction orthogonal to the projection plane 101 can be reduced. However, in the projector 1B illustrated in FIG. 18, the outgoing plane of the light source 61 is arranged in the direction orthogonal to the projected image plane with respect to the illumination unit 20. This makes it difficult to sufficiently reduce the length in the direction orthogonal to the projection plane 101 of the projector.

On the other hand, in this embodiment, the light source unit 60, the image generating unit 10, the illumination unit 20, the first optical system unit 30, and the reflection mirror 41 are arranged in series in a direction parallel with the projected image plane. Note that the phrase "in series in the direction parallel with the projected image plane" herein described is not limited to the configuration in which the units are arranged side by side linearly. The phrase "in series in the direction parallel with the projected image plane" herein described refers to a configuration in which units are arranged side by side in series in one of the Y-direction and the Z-direction which are directions parallel with the projected image plane with respect to the adjacent unit. Accordingly, also the configuration in which the image generating unit 10, the illumination unit 20, the first optical system unit 30, and the reflection mirror 41 of this embodiment are arranged in series in the Y-direction which is a direction parallel with the projected image plane and the light source unit 60 and the illumination unit 20 are arranged in series in the Z-direction which is a direction parallel with the projected image plane corresponds to the configuration in which the units are arranged "in series in the direction parallel with the projected image plane". In this manner, the light source unit 60, the image generating unit 10, the illumination unit 20, the first optical system unit 30, and the reflection mirror 41 are arranged side by side in series in the direction parallel with the projected image plane, thereby making it possible to reduce the length of the projector 1 in the direction (X-direction) orthogonal to the projection plane 101 as illustrated in FIG. 16. This prevents the projector 1 from interfering with the installation space for a chair or desk, and makes it possible to provide the projector 1 with high convenience.

Further, in this embodiment, as illustrated FIG. 15 described above, the power supply units 80 for supplying power to the light source 61 and the DMD 12 are stacked and arranged above the light source unit 60. Thus, it is also possible to reduce the length in the Z-direction of the projector 1.

Figure 19:
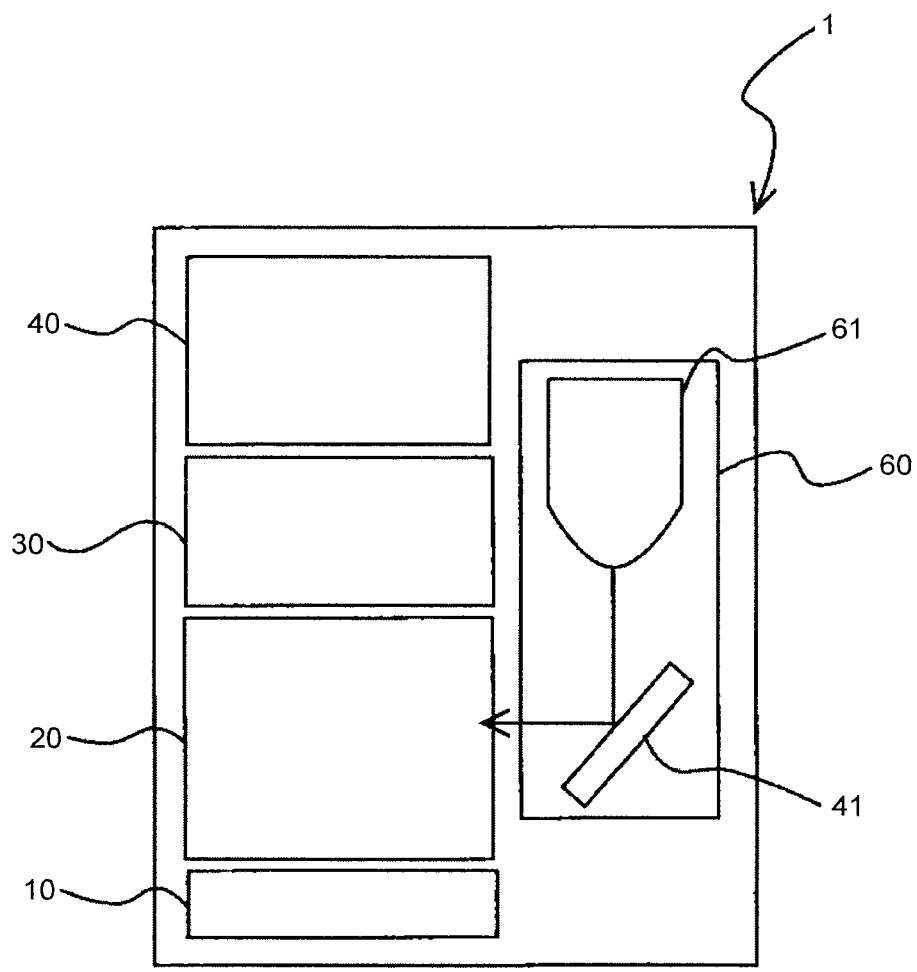
FIG. 19 is a diagram illustrating a modified example of the projector of this embodiment.

Further, in this embodiment, the light source 61 is arranged so as to irradiate light in the Z-direction, but the light source 61 may be arranged so as to irradiate light in the Y-direction as illustrated in FIG. 19. In this case, the light from the light source 61, which exits in the Y-direction, is reflected in the Z-direction by the reflection mirror 41. The subsequent optical path is the same as described above. Also in this configuration, the optical path from the light source 61 to the reflection mirror 41 is in parallel with the projection plane 101, and the light source unit 60 prevents an increase in the length of the projector 1 in the direction (X-direction) orthogonal to the projection plane 101 due to the arrangement in which the image generating unit 10, the illumination unit 20, the first optical system unit 30, and the second optical system unit 40 are arranged in series in the direction parallel with the projection plane.

Figure 20:
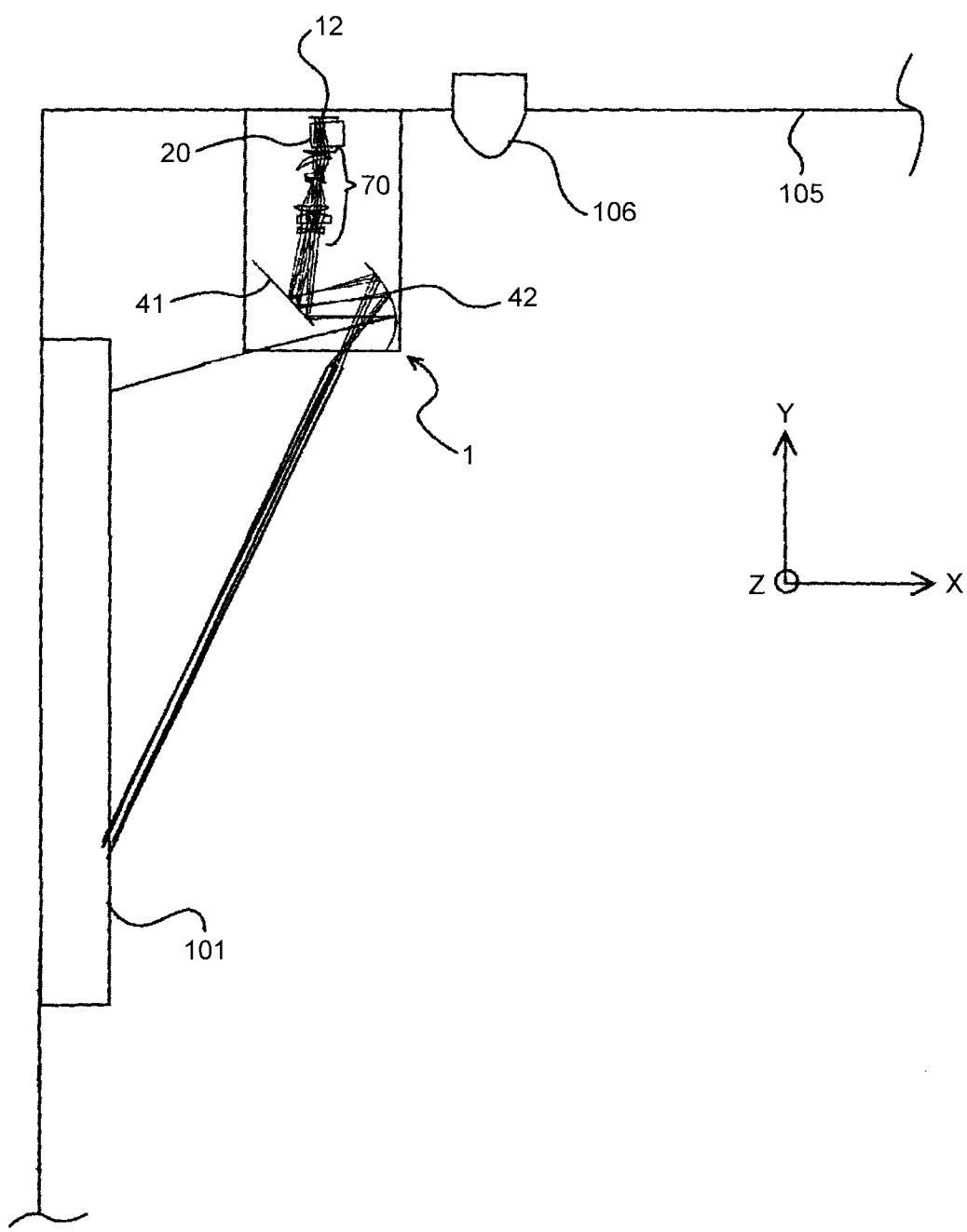
FIG. 20 is a diagram illustrating another usage example of the projector of this embodiment.

FIG. 20 is an explanatory diagram illustrating another usage example of the projector of this embodiment.

As illustrated in FIG. 20, the projector 1 of this embodiment can also be used by being hung from a ceiling 105. Also in this case, the projector 1 of this embodiment has a short length in the direction orthogonal to the projection plane 101, which allows the projector 1 to be installed without interfering with a lighting equipment 106 arranged on the ceiling 105 upon installation of the projector 1 on the ceiling 105.

Further, in this embodiment, the second optical system is formed of the reflection mirror 41 and the concave mirror 42. Alternatively, the second optical system may be formed only of the concave mirror 42. The reflection mirror 41 may be a plane mirror, a mirror having a positive refractive power, or a mirror having a negative refractive power. Further, in this embodiment, a concave mirror is used as the concave mirror 42, but a convex mirror can also be used. In this case, the first optical system 70 is formed so as not to form an intermediate image between the first optical system 70 and the concave mirror 42.

The above-mentioned embodiment is illustrated by way of example, and the present invention has specific advantageous effects for the following modes (1) to (3).

(1) An image projection apparatus, such as the projector 1, including: the light source 61; an image generating element, such as the DMD 12, which receives light from the light source and generates an image; the illumination unit 20 which irradiates the image generating element with the light from the light source 61; a first optical system 70 including a plurality of transmission refractive optical elements; a second optical system which is arranged on an optical path of light emitted from the first optical system and includes a reflection optical element; and a projection optical system that enlarges and projects an image conjugate to the image generated by the image generating element as a projected image, in which the light source 61, the illumination unit 20, and the first optical system 70 are arranged side by side in a direction parallel with the plane of the projected image.

The configuration as described above allows the apparatus to be shortened in the direction orthogonal to the projected image plane. Thus, the apparatus can be shortened in the direction orthogonal to the projected image plane, thereby preventing the installation space for the apparatus from being required in the direction orthogonal to the projected image plane. As a result, in the case of using the image projection apparatus by being placed on a desk or the like, the apparatus can be prevented from interfering with the layout of a desk or a chair even in a narrow indoor space. In the case of using the image projection apparatus by being hung from the ceiling or the like, the image projection apparatus can be prevented from interfering with lighting equipment or the like arranged on the ceiling upon installation of the image projection apparatus, so that the image projection apparatus can be installed at a predetermined position. Consequently, it is possible to provide an image projection apparatus with high convenience.

(2) In the image projection apparatus according to the mode (1) described above, the light source unit 60 is configured to emit light from the light source 61 in parallel with the image generation surface of the image generating element. This configuration eliminates the need to provide a reflection mirror or the like, unlike the configuration illustrate in FIG. 18, and reduces the number of components, which leads to a reduction in cost of the apparatus. As illustrated in FIG. 15 described above, the power supply unit 80 can be arranged in a space above the light source unit 60.

(3) In the image projection apparatus according to the mode (1) or (2) described above, the projection optical system includes the first optical system unit 30 including a first optical system 70, and the second optical system unit 40 including a second optical system; and the image generating element, light source unit 60 and the first optical system unit 30 are positioned and fixed onto the illumination unit 20, and the second optical system unit 40 are positioned and fixed onto the first optical system unit 30.

With this configuration, as described in the above embodiment, the optical path from the light source 61 to the first optical system 70 can be configured to be in parallel with the projection plane 101.

According to the present invention, an image generating unit and a projection optical unit are arranged in a vertical direction and a light source is arranged beside the image generating unit to project an image on a plane positioned in a direction orthogonal to the vertical direction, thereby shortening the length in the direction orthogonal to the projected image plane of the apparatus, as compared with an image projection apparatus in which the image generating unit and the projection optical unit are arranged side by side in series in the direction orthogonal to the plane of a projected image projected on the projection plane. Since the apparatus can be shortened in the direction orthogonal to the projected image plane, an installation space required for the apparatus can be suppressed in the direction orthogonal to the projected image plane. As a result, in the case of using the image projection apparatus by being placed on a desk or the like, the apparatus can be prevented from interfering with the layout of the desk or chair even in a narrow indoor space. Additionally, in the case of using the image projection apparatus by being hung from the ceiling or the like, when the image projection apparatus is installed on the ceiling, the image projection apparatus can be prevented from interfering with lighting equipment or the like arranged on the ceiling. This makes it possible to install the image projection apparatus at a predetermined position. Consequently, it is possible to provide an image projection apparatus with high convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
a light source;
an image generating unit that generates an image by using the light source; and
a projection optical unit that projects the image generated by the image generating unit, wherein
the image generating unit and the projection optical unit are arranged in a vertical direction,
the light source is arranged beside the image generating unit, and
the projection optical unit projects the image on a plane positioned in a direction orthogonal to the vertical direction, and the projection optical unit includes
a first optical system having a plurality of lenses, and
a second optical system having a first mirror, a second mirror, a mirror holder, and a transmitting glass,
the first mirror is positioned on an optical path of light output from the first optical system,
the second mirror is a concave mirror and is positioned on an optical path of light reflected from the first mirror so as to directly project the image to the plane positioned in the direction orthogonal to the vertical direction,
at least the first mirror is fixed to the mirror holder through the interposition of a first bracket, and
the transmitting glass allows the light reflected from the second mirror to be transmitted, and the transmitting glass is fixed to the first bracket that fixes the first mirror to the mirror holder.

2. The image projection apparatus according to claim 1, wherein a plane formed by the light source, the image generating unit, and the projection optical unit corresponds to the plane positioned in the direction orthogonal to the vertical direction, and the light source, the image generating unit, and the projection optical unit are arranged to face a plane on which the image generated by the image generating unit is projected.

3. The image projection apparatus according to claim 1, wherein
the first mirror and the second mirror are held to the second optical system by the mirror holder, and the first mirror and the second mirror are fixed to the mirror holder so that the mirror holder is sandwiched between the first mirror and the second mirror.

4. The image projection apparatus according to claim 3, wherein
the first optical system is fixed to the image generating unit by a lens holder, and
the mirror holder is fixed to the lens holder.

5. The image projection apparatus according to claim 1, wherein
the second mirror is fixed to the mirror holder through the interposition of a second bracket, and
an edge opposite to the transmitting glass of the second mirror is pressed by a plate spring to the second bracket, and an edge opposite to the first optical system of the second mirror is fixed with screws.

6. The image projection apparatus according to claim 5, wherein
the first bracket is disposed at a reflection-surface side of the first mirror, and the second bracket is disposed at a reflection-surface side of the second mirror.

* * * * *